United States Patent [19]

Waki et al.

[11] Patent Number: 4,633,976

[45] Date of Patent: Jan. 6, 1987

[54] METHOD OF CONTROLLING LUBRICATING-OIL QUANTITY FOR INTERNAL MIXER

[75] Inventors: Yusaku Waki, Hiratsuka; Hideki Aoyama, Yokohama, both of Japan

[73] Assignee: The Yokohama Rubber Co., Ltd., Tokyo, Japan

[21] Appl. No.: 799,751

[22] Filed: Nov. 19, 1985

[30] Foreign Application Priority Data

Aug. 12, 1983 [JP] Japan ................. 58-146716

[51] Int. Cl.$^4$ .................. F01M 1/18; F01M 11/10
[52] U.S. Cl. ........................................... 184/6.4
[58] Field of Search .............. 184/6, 6.4, 108; 277/22, 26

[56] References Cited

U.S. PATENT DOCUMENTS

| | | | |
|---|---|---|---|
| 3,169,808 | 2/1965 | Jones | 184/6.4 |
| 3,812,627 | 5/1974 | Gebel | 184/108 |
| 3,980,357 | 9/1976 | Bellati | 184/6.4 |
| 4,126,207 | 11/1978 | Dibowski | 184/6.4 |
| 4,420,064 | 12/1983 | Lohnherr | 184/6.4 |

FOREIGN PATENT DOCUMENTS 2147951  5/1985  United Kingdom ............... 418/206

*Primary Examiner*—Carlton R. Croyle
*Assistant Examiner*—Jane E. Obee
*Attorney, Agent, or Firm*—Armstrong, Nikaido, Marmelstein & Kubovcik

[57] ABSTRACT

The temperature of a seal ring is detected by a temperature sensor during mixing or kneading operation of an internal mixer or a kneader and the detected temperature is compared by a temperature controller set to a necessary temperature, and while the rotation of motor for a pump is being changed in accordance with the output signals from the temperature controller through a control box, a suitable quantity of a lubricating oil is sequentially supplied to a seal surface in accordance with the temperature of the seal ring.

1 Claim, 3 Drawing Figures

METHOD OF CONTROLLING LUBRICATING-OIL QUANTITY FOR INTERNAL MIXER

BACKGROUND OF THE INVENTION

This invention relates generally to a method of controlling the quantity of a lubricating oil in or for an internal mixer and, more particularly to a method of controlling the quantity of a lubricating oil for an internal mixer in which the temperature generated at a seal ring of a dust seal portion is detected and a lubricating oil is supplied to a seal surface in a quantity corresponding to the generated temperature.

In a conventional rubber mixer, a dust seal portion for supporting the shaft portion of a kneading rotor of the mixer is likely to generate heat due to presence in gaps of matters such as carbon, powder, rubber and so forth, and a sliding surface is also likely to become coarse. When the sliding surface becomes coarse, it results in the problem such as leaking of carbon, and the mixer must be stopped for an extended period of time in order to replace the component and to adjust the machine. To prevent this problem, a mechanical seal has heretofore been used in the dust seal portion and a large quantity of a lubricating oil is supplied to the mechanical seal portion.

The feed quantity of the lubricating oil is set in accordance with the heat generation condition of the seal ring. Generally, the temperature of the seal ring varies from room temperature to above 80° C., and the factors that are involved with the heat generation are the rotation of a rotor, the kinds of mixtures, the feed sequence of materials, and a ground internal pressure which is generally from 2 to 3 kg/cm$^2$, but which may reach a peak of 10–20 kg/cm$^2$, and these factors change continually. The heat generation condition also widely changes depending upon the solubility of chemicals or matters in gaps.

For reasons described above, it has been necessary in the past to set the oil quantity to the level that is necessary at the time of the highest heat generation.

The below table illustrates temperatures of the seal ring in accordance with ordinary materials to be kneaded.

| | product | | number of notches | seal ring temperature |
|---|---|---|---|---|
| 1 | matter kneaded in the 1st step | NR type | 6 | 60~80° C. |
| 2 | matter kneaded in the 1st step | SBR type | 4 | 40~60° C. |
| 3 | matter kneaded in one-step kneading | | 2 | 25~40° C. |

Notes:
Products 1 and 2 are those kneaded in the 1st one of a multi-step kneading.
The term "number of notches" means the number of adjustment knobs for the pump discharge quantity, 8 being the maximum. The term "one-step" means those rubbers of which the kneading can be done in a single step.

When the feed quantity of the lubricating oil is set in accordance with the highest heat generation of the seal ring as described above, the feed quantity tends to be greater than necessary. In other words, the lubricating oil is consumed in a greater quantity than necessary.

A proposal has been made in which a pump motor for supplying the lubricating oil is variable in order to select a suitable rotation of the pump in accordance with the rotation of the rotor. However, this proposal does not directly cope with the problem of the generated heat of or in the seal ring. Moreover, it is that a temperature rise does not take place immediately after the start of mixing but takes place only after mixing of several to some dozens of batches in the mixer. Therefore, the oil quantity cannot be reduced even at the time of a low heat generation and the lubricating oil has to be used in quantities more than necessary, in the same way as above described.

SUMMARY OF THE INVENTION

In order to eliminate the problems of the prior art indicated above, the present invention is designed to provide a method of controlling the quantity of a lubricating oil for or in an internal mixer which can supply a suitable quantity of the lubricating oil to a seal surface in accordance with the heat generation condition of or in a seal ring.

THE PREFERRED EMBODIMENT

Hereinafter, a preferred embodiment of the present invention will be described with reference to the accompanying drawings.

Figure 1:
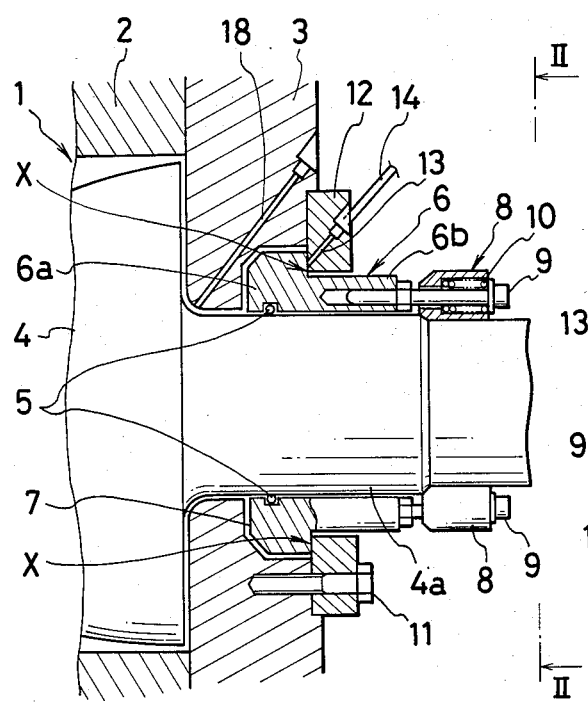
FIG. 1 is a sectional view of essential portions of an internal mixer or a kneader to which the present invention is applied.

FIG. 1 is a sectional view showing essential portions of an internal mixer to which the present invention is applied. This mixer 1 is of a sealed structure consisting of a casing 2 and an end frame 3, and two rubber kneading rotors 4 for kneading rubber materials are rotatably disposed inside the kneader. A stepped rotary ring 6 is fitted rotatably and slidably to the outer peripheral surface of the shaft 4a of the rubber kneading rotor 4 projecting from the end frame 3 via an O-ring 5, and an increased diameter portion 6a of the stepped rotary ring 6 meshes with a recess 7 which is formed on the end frame 3. A spring support ring 8 is fitted to the end surface of a reduced diameter portion 6b of the stepped rotary ring 6 and is always impelled in the predetermined direction by a tension bolt 9 and a spring 10 which are fitted to the stepped rotary ring 6.

Figure 2:
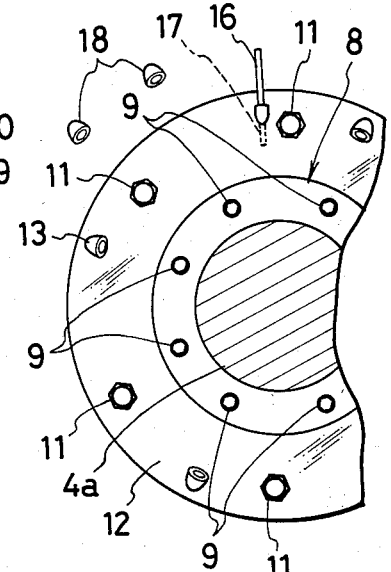
FIG. 2 is a side view taken along line II—II of FIG. 1.

A seal ring 12 is fitted to the end surface of the end frame 3 by a plurality of fitting bolts 11 constituting a dust seal portion as depicted in FIG. 2, and the increased diameter portion 6a of the stepped rotary ring 6 impelled by the tension bolt 9 and the spring 10 comes into contact with the inner wall surface of the seal ring 12, thereby forming a seal surface X.

Therefore, leakage of materials to be kneaded (not shown) such as rubber from inside the mixer or kneader 1 to the outside is prevented by the seal surface X in cooperation with the 0-ring 5, and the seal pressure of the seal surface X is adjusted by rotating the tension bolt 9 screwed to the stepped rotary ring 6.

A plurality of oil supply ports 13 are bored on the seal ring 12 that constitutes the seal surface X, and are communicated with a lubricating oil supply source 15 (FIG. 3) through an oil supply pipe 14 in order to supply the lubricating oil to the seal surface X.

A fitting hole 17 is formed on the seal ring 12 and a temperature sensor 16 is fitted into this fitting hole 17 in order to sense the heat generation condition of the seal surface X. The depth of this fitting hole 17 is preferably such that the temperature sensor 16 can approach the seal surface X as closely as possible.

It is possible to dispose a cooling passage inside the seal ring 12 to directly form a jacket construction for cooling the seal surface X for sealing, or to wind another jacket ring on the seal ring 12 in a manner such that another jacket ring has a jacket structure and water is passed therethrough to improve the cooling effect.

An inlet 18 for a process oil for dissolving the materials to be kneaded that enter the gap between the shaft 4a of the kneading rotor 4 and the end frame 3 while being pressurized is defined on the end frame 3. The process oil is supplied from a supply source, not shown, dissolves the materials to be kneaded and prevents the heat generation and scorching of rubber due to the introduction of materials to be kneaded.

Figure 3:
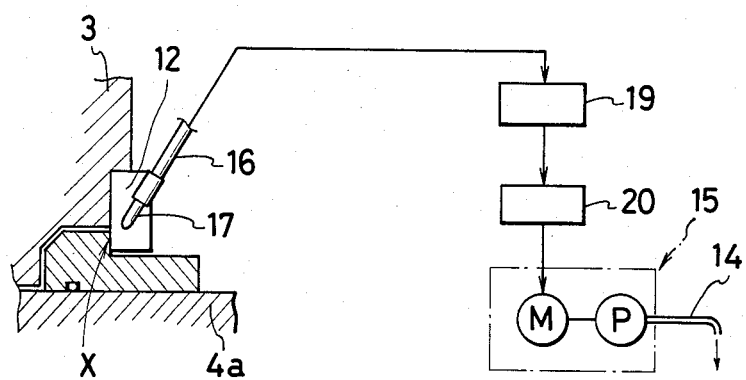
FIG. 3 is a block diagram showing a method of controlling the rotation of a pump for a lubricating oil.

FIG. 3 is a block diagram for controlling the rotation of a pump P for the lubricating oil. Reference numeral 19 represents a temperature controller which is connected to the temperature sensor 16, and reference numeral 20 is a control box. A lubricating oil supply source 15 is constituted by a pump motor M in combination with the lubricating oil pump P. Necessary temperature data are set to the temperature controller 19, the pump motor M is made variable by the control box 20 in accordance with the signals from the temperature controller 19, and the rotation of the lubricating oil pump P can thus be changed.

In other words, the discharge quantity of the lubricating oil pump P can be controlled in accordance with the temperature of the seal ring 12.

As described above, the present invention senses the temperature of the seal ring 12 with the temperature sensor 16 during the kneading operation of the kneader 1, and compares this detection temperature with the temperatures set in or to the temperature controller 19. Then, while the rotation of the pump motor M is being changed by the output signals from the temperature controller 19 through the control box 20, the present invention sequentially supplies lubricating oil to the seal surface X in accordance with the temperature of the seal ring 12.

The present invention is characterized in that the oil supply ports 13 connected to the lubricating oil supply source and the temperature sensor are disposed on the seal ring of the dust seal portion which rotatably supports the rubber kneading rotor, the generated temperature of the seal ring is detected by the temperature sensor, and the quantity of the lubricating oil to be supplied to the seal surface of the seal ring from the lubricating oil supply source is controlled in accordance with the temperature of heat generated in the seal ring. Therefore, the present invention can supply a suitable quantity of lubricating oil to the seal surface in accordance with the heat generation condition of the seal ring, and can thus drastically reduce the quantity required of the lubricating oil.

Since the operations ranging from the temperature detection of the seal ring to the supply of the lubricating oil are all effected automatically, the job of an operator can be remarkably simplified and the operation efficiency can be remarkably improved. The present invention is extremely effective for those portions where heat generation conditions change incessantly.

What is claimed is:

1. A method of controlling the quantity of a lubricating oil for an internal mixer characterized in that oil supply ports connected to a lubricating oil supply source and a temperature sensor are disposed on a dust seal portion of seal ring for rotatably supporting rotors, the seal ring has a seal surface, the temperature of heat generated in said seal ring is detected by said temperature sensor, and the quantity of the lubricating oil to be supplied to the seal surface of said seal ring from said lubricating oil supply source is controlled in accordance with the temperature of heat generated in said seal ring.

* * * * *